Patented May 3, 1949

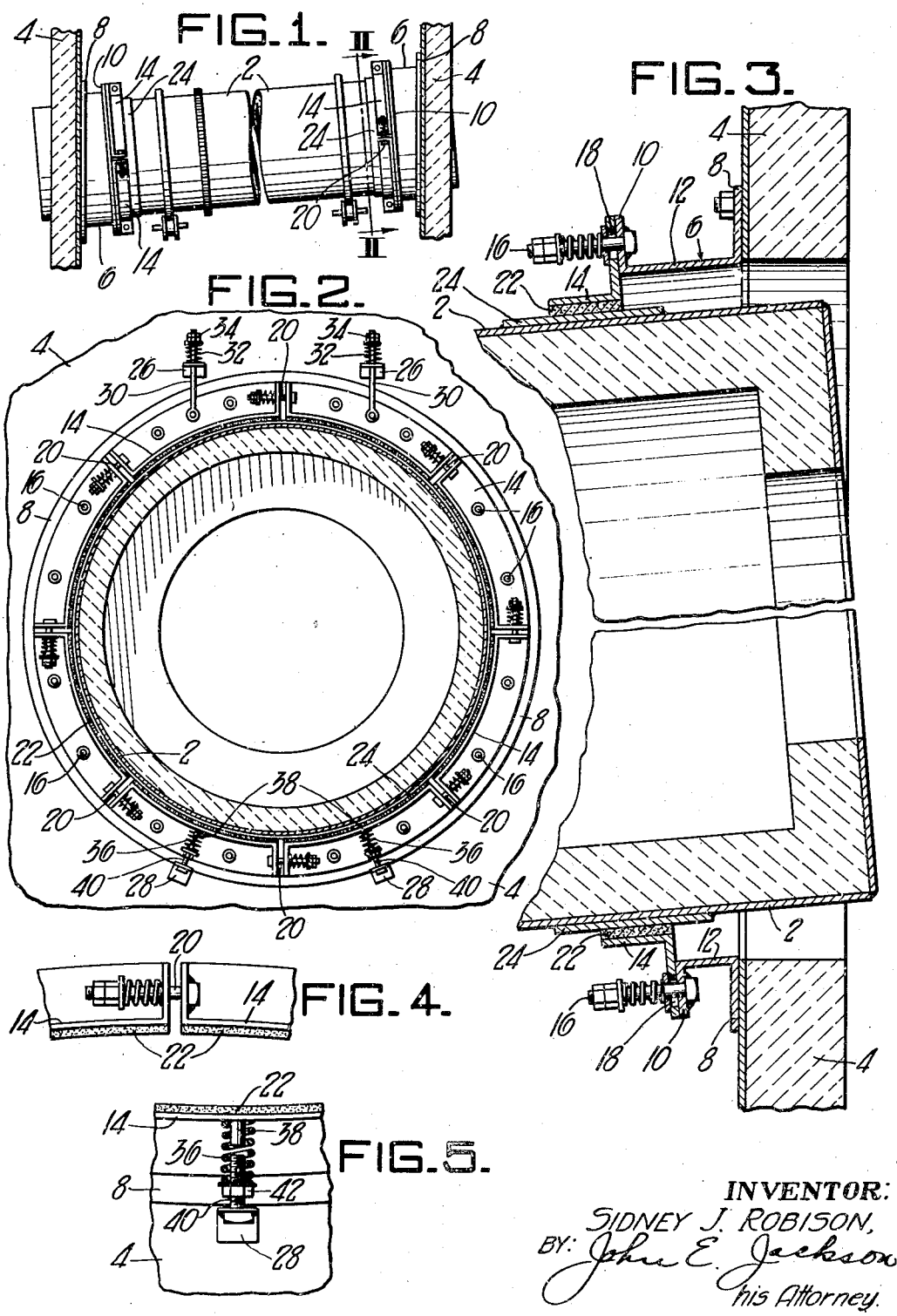

2,469,078

UNITED STATES PATENT OFFICE 2,469,078

SEAL FOR ROTARY KILNS

Sidney J. Robison, Chicago, Ill., assignor to Universal Atlas Cement Company, a corporation of Indiana Application May 8, 1945, Serial No. 592,599

2 Claims. (Cl. 263—33)

This invention relates to rotary kilns, ovens, driers, and the like, and more particularly to an improved seal between the rotating and stationary members thereof.

In order to prevent the escape of dust and gases, and also to prevent the entrance of air into the gas chamber at the exit end of rotary kilns, it is necessary to have a substantially air-tight seal between the rotary and stationary members. Entrance of air at the exit end of the rotary shells cools the outgoing gases and reduces the steam production in waste heat boilers where such outgoing gases are so used. Since the rotary shell is frequently slightly flattened or elliptical, and due to warpage may have an eccentric movement, it is difficult to provide a seal which is substantially air-tight. In addition to the foregoing, provision must be made for longitudinal expansion and contraction of the rotary shell due to changes in temperatures. The seal must also be heat resistant since in certain types of kilns, particularly those used for roast ores and in the manufacture of cement, very high temperatures are employed.

It is accordingly an object of the present invention to provide a seal which meets the foregoing difficulties.

It is a further object of the present invention to provide a seal between the rotary and stationary members of a kiln which is simple and rugged in design and at the same time very effective under operating conditions.

The foregoing and further objects will be apparent from the specification and drawing, wherein:

Figure 1 is an elevation of a rotary kiln;

Figure 2 is a cross section on line II—II of Figure 1;

Figure 3 is a fragmentary longitudinal section of a kiln showing my improved seal between the rotary and stationary members;

Figure 4 is an enlarged end view of a portion of the sealing ring of Figure 2; and Figure 5 is an enlarged detail of the sealing ring suspension means.

Referring more particularly to the drawing, the numeral 2 designates a firebrick-lined rotary shell which extends into a stationary gas chamber or backhousing 4. A channel-shaped ring 6 having one flange 8 normal to the longitudinal axis of the ring and the other flange 10 normal to the axis of the rotary shell is securely mounted on the backhousing 4 so that it extends around the rotary shell 2 adjacent the end thereof. It is noted that the web 12 of the channel progressively increases in width from the lowermost portion thereof toward the top portion when the seal is at the upper end of the kiln, as shown in the drawing. If used at the lower end, the relative disposition of the wide and narrow portions of the flange are reversed.

Arcuate-shaped ring segments 14 are secured to the flange 10 by spring-biased bolts 16 the heads of which are welded to the flange. The holes 18 in the segments through which the bolts pass are somewhat larger in diameter than the diameter of the bolts to permit sliding movement of the segments with respect to the flange. The ring segments are connected together by spring-biased bolts 20 to provide a flexible sealing ring. Linings 22 of asbestos material, such as conventional brake linings, are secured to the inner surfaces of the segments. Due to the spring-biased connections between the segments, the brake lining is held in contact with the outer surface of the rotary shell 2 since the provision for sliding movement between the segments and the flange permits the sealing ring to accommodate itself to eccentricities or out of roundness of the rotary shell.

If desired, a wear resistant band 24 of somewhat greater width than the linings 22 may be welded or otherwise suitably secured to the rotary shell under the sealing ring. Due to the width of this band being greater than that of the linings, compensation for expansion or contraction of the shell is thereby provided.

In addition to the segments 14 being slidably mounted on the flange 10 by bolts 16, additional upper and lower brackets 26 and 28, respectively, are welded or otherwise secured to the stationary member 4 or ring 6. The upper brackets have eye-bolts 30, pivotally connected to segments 14, extending therethrough to carry part of the weight of the segmental ring on compression springs 32, the compression on which is adjustable by nuts 34. Compression springs 36 are arranged between the lower brackets 28 and the ring segments 14 by means of studs 38 and bolts 40, the compression on the springs 36 being adjustable by nuts 42. By this arrangement, the segmental ring is carried by the compression springs 32 and 36 so that the weight thereof is taken off the lining 22 on the upper segments, thereby materially lengthening the life thereof.

While I have shown and described one specific embodiment of my invention, it will be understood that this embodiment is merely for the purpose of illustration and description and that various other forms may be devised within the scope of my invention, as defined in the appended claims.

I claim:

1. A seal for rotary kilns and the like having a rotatable member and a stationary chamber in communication therewith comprising an annular channel having a web of varying width and having one flange normal to the axis of said channel and the other flange normal to the axis of rotation of said rotatable member, said channel being mounted on said stationary member about said rotatable member by means of said first mentioned flange, a plurality of arcuate segments slidably mounted on the other of said flanges, said segments being resiliently connected together to form a yieldable sealing ring around said rotatable member and to hold said ring in sealing contact with said rotatable member.

2. A seal for rotary kilns and the like having a rotatable member and a stationary chamber in communication therewith comprising a wear resistant band mounted around said rotatable member adjacent said chamber, an annular channel having a web of varying width and having one flange normal to the axis of said channel and the other flange normal to the axis of rotation of said rotatable member, said channel being mounted on said stationary member about said band by means of said first mentioned flange, a plurality of arcuate segments slidably mounted on the other of said flanges, a heat resistant lining on the inside of said segments, said segments being resiliently connected together to form a yieldable sealing ring around said rotatable member and to hold said ring in sealing contact with said band.

SIDNEY J. ROBISON.

REFERENCES CITED

The following references are of record in the file of this patent:

UNITED STATES PATENTS

| Number | Name | Date |
| --- | --- | --- |
| 1,319,700 | Gould | Oct. 28, 1919 |
| 1,998,492 | Christensen | Apr. 23, 1935 |

FOREIGN PATENTS

| Number | Country | Date |
| --- | --- | --- |
| 184,798 | Germany | May 14, 1907 |
| 595,424 | France | Oct. 2, 1925 |